(12) United States Patent
Himmelberger et al.

(10) Patent No.: US 9,914,860 B2
(45) Date of Patent: Mar. 13, 2018

(54) COHESIVE FASTENER FORMULATIONS WITH OLEFIN BLOCK COPOLYMERS

(71) Applicant: Rohm and Haas Company, Philadelphia, PA (US)

(72) Inventors: Daniel W. Himmelberger, Green Lane, PA (US); William B. Griffith, Jr., North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 79 days.

(21) Appl. No.: 14/895,636

(22) PCT Filed: Aug. 18, 2014

(86) PCT No.: PCT/US2014/051438
§ 371 (c)(1),
(2) Date: Dec. 3, 2015

(87) PCT Pub. No.: WO2015/026701
PCT Pub. Date: Feb. 26, 2015

(65) Prior Publication Data
US 2016/0168433 A1    Jun. 16, 2016

Related U.S. Application Data

(60) Provisional application No. 61/867,844, filed on Aug. 20, 2013.

(51) Int. Cl.
*C09J 153/00* (2006.01)
*C08L 53/00* (2006.01)
*C08J 5/18* (2006.01)

(52) U.S. Cl.
CPC ............... *C09J 153/00* (2013.01); *C08J 5/18* (2013.01); *C08L 53/00* (2013.01); *C08J 2353/00* (2013.01); *C08J 2423/06* (2013.01); *C08L 2207/066* (2013.01)

(58) Field of Classification Search
CPC ...... C09J 153/00; C09J 5/18; C08J 5/18; C08J 2353/00; C08J 2423/06; C08L 53/00
See application file for complete search history.

(56) References Cited

U.S. PATENT DOCUMENTS

| | | | |
|---|---|---|---|
| 4,798,081 A | 1/1989 | Hazlitt et al. | |
| 5,085,655 A | 2/1992 | Mann et al. | |
| 6,582,829 B1* | 6/2003 | Quinn et al. | C08F 210/16 428/513 |
| 7,524,911 B2 | 4/2009 | Karjala et al. | |
| 7,608,668 B2 | 10/2009 | Li Pi Shan et al. | |
| 7,858,706 B2 | 12/2010 | Arriola et al. | |
| 9,006,320 B2 | 4/2015 | Ibbitson et al. | |
| 2005/0277905 A1 | 12/2005 | Pedersen et al. | |
| 2010/0272946 A1 | 10/2010 | Pepper et al. | |
| 2011/0262747 A1 | 10/2011 | Yalvac et al. | |
| 2012/0149827 A1* | 6/2012 | Hu et al. | C09J 123/02 524/505 |
| 2012/0165455 A1* | 6/2012 | Vitrano et al. | C08L 23/06 524/505 |
| 2015/0368521 A1 | 12/2015 | Einsla et al. | |
| 2016/0052242 A1 | 2/2016 | Breed et al. | |
| 2016/0053143 A1 | 2/2016 | Himmelberger et al. | |

OTHER PUBLICATIONS

Dobrynin, "Phase coexistence in random copolymers", The Journal of Chemical Physics, 1997, pp. 9234-9238, vol. 107, Issue 21.
PCT/US14/051438, International Search Report and Written Opinion dated Apr. 11, 2014.
PCT/US14/051438, International Preliminary Report on Patentability dated Feb. 23, 2016.

* cited by examiner

*Primary Examiner* — Nathan M Nutter (57) ABSTRACT

The present disclosure is directed to a composition comprising a) an olefin block copolymer; b) a tackifier; c) an ethylene-based polymer with a density from 0.90 g/cc to 0.94 g/cc; and d) an oil. The composition finds advantageous application as a cohesive layer in a fastening device, for example, a fastening device for a hygiene absorbent product.

15 Claims, 1 Drawing Sheet

COHESIVE FASTENER FORMULATIONS WITH OLEFIN BLOCK COPOLYMERS

REFERENCE TO RELATED APPLICATIONS

The present application claims priority to U.S. Application No. 61/867,844, filed Aug. 20, 2013.

FIELD

The present disclosure is directed to a composition for cohesive layers and fastening devices utilizing the cohesive layer.

BACKGROUND

Hot melt, pressure sensitive adhesive formulations find many applications, one of which is as a pressure sensitive adhesive for recloseable fastening systems for hygiene absorbent products. Hygiene absorbent products (or HAPs) include diapers, adult incontinence products, swim-wear diapers, and training pants. Hygiene absorbent products are typically comprised of layers of non-woven fabrics, comprising natural or synthetic polymer fibers and films made from thermoplastics polymers. HAP reliability (i.e., prevention of leakage), comfort (i.e. softness and form-fit during use), and longevity (e.g., reclose-ability after opening (to check for exudates)) depends upon the ability of the "pressure sensitive adhesive fastening tab" to adhere only to the tab landing zone, while not sticking to human skin, other HAP parts, or foreign materials such as contaminants. HAP reliability, comfort, and longevity diminish when the HAP fastening system adheres to foreign materials. The fastening system's adherence to contaminants or foreign objects weakens the bond strength, and may compromise the fastening system altogether.

Similar to HAPs, other products, such as protective medical garments and medical drapes, require cohesive fastening systems to prevent contamination of blood-borne pathogens to the medical garment wearer (e.g. surgeons and medical assistants), and to provide isolation of the patient's wound or surgical sites for selected medical drapes. Conventional pressure sensitive adhesive tabs (such as diaper tabs), mated together, exhibit low peel force for repositionability, yet high shear in order to keep the HAP closed. However, conventional diaper tabs also adhere to foreign materials, which degrade reliability. Mechanical fasteners, such as hook and loop fasteners, are problematic, because they are rough on the skin, and they are also expensive to manufacture.

A need exists for a pressure sensitive adhesive composition that adheres only to itself (cohesive), while simultaneously providing (i) low T-peel strength (for example, less than 10 N/in) and low tack (does not form a quick bond to substrates other than itself), while (ii) maintaining high lap shear (for example, greater than 1 hour). A need further exists for fastening systems utilizing cohesive layers formed from such a composition. These needs and others have been met by the following invention.

SUMMARY

The present disclosure is directed to compositions that exhibit low T-peel force (for example, less than 10 N/in) and high lap shear (for example, greater than 1 hour) when used as cohesive layers in fastening devices.

In an embodiment, the present disclosure provides a composition comprising the following components:

a) an olefin block copolymer;
b) a tackifier;
c) an ethylene-based polymer with a density from 0.90 g/cc to 0.94 g/cc; and
d) an oil.

In an embodiment, the present disclosure provides a fastening device, which comprises the following:

a first substrate comprising a first cohesive layer;
a second substrate comprising a second cohesive layer; and
wherein each cohesive layer is independently formed from a composition comprising:
a) an olefin block copolymer;
b) a tackifier;
c) an ethylene-based polymer with a density from 0.90 g/cc to 0.94 g/cc; and
d) an oil.

DETAILED DESCRIPTION

As discussed above, the invention provides a composition comprising the following components:

a) an olefin block copolymer;
b) a tackifier;
c) an ethylene-based polymer with a density from 0.90 g/cc to 0.94 g/cc; and
d) an oil.

An inventive composition may comprise a combination of two or more embodiments, as described herein.

Each component of an inventive composition may comprise a combination of two or more embodiments as described herein.

The embodiments described herein apply to an inventive composition, an inventive film, and inventive article, and an inventive fastening device.

In one embodiment, the ethylene-based polymer has a melt index from 0.5 g/10 min to 75 g/10 min, further from 2 g/10 min to 75 g/10 min, further from 5 g/10 min to 75 g/10 min.

In one embodiment, the ethylene-based polymer has a melt index from 10 g/10 min to 75 g/10 min, further from 20 g/10 min to 70 g/10 min, further from 30 g/10 min to 60 g/10 min.

In one embodiment, the ethylene-based polymer has a density from 0.91 g/cc to 0.94 g/cc, further from 0.92 to 0.94 g/cc, further from 0.92 to 0.93 g/cc.

In one embodiment, the ethylene-based polymer has a melt temperature (Tm) from 90° C. to 115° C., further from 100° C. to 115° C., further from 110° C. to 115° C.

In one embodiment, the ethylene-based polymer is a LDPE.

In one embodiment, the ethylene-based polymer is an ethylene homopolymer. In a further embodiment, the ethylene homopolymer has a melt index from 30 g/10 min to 50 g/10 min.

In one embodiment, the olefin block copolymer is an ethylene/α-olefin multi-block copolymer.

In one embodiment, the tackifier is selected from the group consisting of the following: a non-hydrogenated aliphatic $C_5$ resin, a hydrogenated aliphatic $C_5$ resin, an aromatic modified C$_5$ resin, a terpene resin, a hydrogenated C$_9$ resin, and a combination thereof. In a further embodiment, the tackifier has a density from 0.92 g/cc to 1.06 g/cc. In a further embodiment, the tackifier has a melt viscosity less than 1000 Pascal second (Pa·s) at 175° C.

In one embodiment, the composition comprises the following:
(a) from 30 wt % to 50 wt % of the olefin block copolymer;
(b) from 30 wt % to 50 wt % of the tackifier;
(c) from 5 wt % to 15 wt % of the ethylene-based polymer; and
(d) from 5 wt % to 15 wt % of the oil. Each weight percent is based on the weight of the composition.

In one embodiment, the amount of olefin block copolymer present in the composition is greater than, or equal to, the amount of tackifier present in the composition.

In one embodiment, the composition has a density from 0.850 g/cc to 0.925 g/cc.

In one embodiment, the composition has a melt index from 10 g/10 min to 100 g/10 min (190° C. and 2.16 kg).

In one embodiment, the composition has a lap shear greater than 1 hour.

In one embodiment, the composition has a 180° peel force from "greater than 0 N/inch" to 4 N/inch.

In one embodiment, the composition has a T-peel force from 1 N/inch to 10 N/inch.

An inventive composition may comprise a combination of two or more embodiments as described herein.

The ethylene-based polymer may comprise a combination of two or more embodiments as described herein.

The olefin block copolymer may comprise a combination of two or more embodiments as described herein.

The tackifier may comprise a combination of two or more embodiments as described herein.

The oil may comprise a combination of two or more embodiments as described herein.

The invention also provides a film formed from an inventive composition.

The invention also provides an article comprising at least one component formed from an inventive composition.

A film may comprise a combination of two or more embodiments as described herein.

An article may comprise a combination of two or more embodiments as described herein.

The invention also provides a fastening device comprising the following:
a first substrate comprising a first cohesive layer;
a second substrate comprising a second cohesive layer; and
wherein each cohesive layer is independently formed from a composition comprising:
a) an olefin block copolymer, as described herein;
b) a tackifier, as described herein;
c) an ethylene-based polymer with a density from 0.90 g/cc to 0.94 g/cc, as described herein; and
d) an oil, as described herein.

In one embodiment for the fastening device, the ethylene-based polymer has a melt index from 0.5 g/10 min to 75 g/10 min.

In one embodiment for the fastening device, the same composition is used to form the first cohesive layer and the second cohesive layer. In a further embodiment, the composition has a density from 0.850 g/cc to 0.925 g/cc. In a further embodiment, the composition has a melt index from 10 g/10 min to 100 g/10 min (190° C. and 2.16 kg).

In one embodiment for the fastening device, the fastening device is a component of a hygiene absorbent product.

In one embodiment for the fastening device, the first substrate is a component of a tab for a hygiene absorbent product.

In one embodiment for the fastening device, the second substrate is a component of a landing area for a hygiene absorbent product.

In one embodiment for the fastening device, the fastening device is a component of a diaper.

In one embodiment for the fastening device, the fastening device is a component of an article selected from the group consisting of a medical garment, a protective garment, a medical drape, and combinations thereof.

A fastening device may comprise a combination of two or more embodiments described herein.

A. Olefin Block Copolymer

The present composition includes an olefin block copolymer. An "olefin block copolymer" (or OBC), as used herein, is a multi-block or segmented copolymer and includes two or more chemically distinct regions or segments (referred to as "blocks") joined in a linear manner, that is, a polymer comprising chemically differentiated units, which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or $M_w/M_n$), block length distribution, and/or block number distribution due to the unique process making of the copolymers. More specifically, when produced in a continuous process, embodiments of the OBC may possess a PDI ranging from 1.7 to 8; or from 1.7 to 3.5; or from 1.7 to 2.5; or from 1.8 to 2.5; or from 1.8 to 2.1. When produced in a batch or semi-batch process, embodiments of the OBC may possess a PDI ranging from 1.0 to 2.9; or from 1.3 to 2.5; or from 1.4 to 2.0; or from 1.4 to 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol %, with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units, in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments," on the other hand, refer to blocks of polymerized units, in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI, fitting a Schulz-Flory distribution rather than a Poisson distribution. The present OBC is produced by the polymerization process described in U.S. Pat. No. 7,858,706 and U.S. Pat. No. 7,608,668, which results in a product having both a polydisperse block distribution, as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the olefin block copolymer is an ethylene/α-olefin multi-block copolymer. In a further embodiment, the ethylene/α-olefin multi-block copolymer has a density from 0.86 to 0.89 g/cc, further from 0.87 to 0.88 g/cc (1 cc=1 cm$^3$).

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2.$$

In an embodiment, the ethylene/α-olefin multi-block copolymer is defined as having (A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,$$

wherein d is from 0.866 g/cc, or 0.87 g/cc to 0.89 g/cc, or 0.91 g/cc, or 0.93 g/cc, and Tm is from 113° C., or 115° C., or 117° C., or 118° C. to 120° C., or 121° C., or 125° C.

In an embodiment, the ethylene/α-olefin multi-block copolymer is defined as having (B) Mw/Mn from 1.7 to 3.5, and is characterized by a heat of fusion, ΔH in J/g, and a delta quantity, ΔT, in degrees Celsius, defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d).$$

In an embodiment, the ethylene/α-olefin multi-block copolymer is defined as having (D) a molecular weight fraction which elutes between 40° C. and 130° C., when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and a molar comonomer content (based on the whole polymer) within 10 percent of that of the ethylene/α-olefin interpolymer.

In an embodiment, the ethylene/α-olefin multi-block copolymer is defined as having (E) a storage modulus at 25° C., G'(25° C.), and a storage modulus at 100° C., G'(100° C.), wherein the ratio of G' (25° C.) to G'(100° C.) is in the range of about 1:1 to about 9:1.

In an embodiment, the ethylene/α-olefin multi-block copolymer is defined as having (F) a molecular fraction which elutes between 40° C. and 130° C., when fractionated using TREF, characterized in that the fraction has a block index of at least 0.5, and up to about 1, and a molecular weight distribution, Mw/Mn, greater than about 1.3. In a further embodiment, the ethylene/α-olefin multi-block copolymer has a molecular weight distribution, Mw/Mn, less than, or equal to, about 3.5.

In an embodiment, the ethylene/α-olefin multi-block copolymer is defined as having (G) average block index greater than zero, and up to about 1.0, and a molecular weight distribution, Mw/Mn, greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8α-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, butene, hexene, or octene.

In an embodiment, the ethylene/α-olefin multi-block copolymer excludes styrene.

In an embodiment, the ethylene/α-olefin multi-block copolymer is an ethylene/octene multi-block copolymer. In a further embodiment, the ethylene/octene multi-block copolymer has a density from 0.86 to 0.89 g/cc (1 cc=1 cm$^3$).

In an embodiment, the soft segment of the ethylene/octene multi-block copolymer includes from 5 mol %, or 7 mol %, or 9 mol %, or 11 mol %, or 13 mol %, or 15 mol % to 18 mol % or 20 mol % units derived from octene. The ethylene/octene multi-block copolymer has a density from 0.866 g/cc to 0.887 g/cc. The ethylene/octene multi-block copolymer has a melt index (MI) from 0.5 g/10 min, or 5.0 g/10 min, or 10 g/10 min, or 15 g/10 min, to 20 g/10 min, or 25 g/10 min, or 30 g/10 min.

In an embodiment, the OBC is an ethylene/octene multi-block copolymer with one, some, or all of the following properties: a density from 0.87 g/cc to 0.89 g/cc, a melt index from 12 g/10 min to 18 g/10 min, and a melt temperature from 118° C. to 122° C.

An olefin block copolymer may comprise a combination of two or more embodiments as described herein.

An ethylene/α-olefin multi-block copolymer may comprise a combination of two or more embodiments as described herein.

B. Tackifier

The present composition includes a tackifier. The tackifier may be a non-hydrogenated aliphatic C$_5$ (five carbon atoms) resin, a hydrogenated aliphatic C$_5$ resin, an aromatic modified C$_5$ resin, a terpene resin, a hydrogenated C$_9$ resin, or combinations thereof.

In one embodiment, the tackifier has a density from 0.92 g/cc to 1.06 g/cc, further from 0.92 g/cc to 1.04 g/cc, further from 0.92 g/cc to 1.02 g/cc.

In one embodiment, the tackifier has a softening temperature (softening point; Ring and Ball measured in accordance with ASTM E 28) from 80° C. to 120° C., or from 90° C. to 110° C., or from 90° C. to 100° C.

In one embodiment, the tackifier has a melt viscosity less than 1000 Pascal second (Pa·s) at 175° C. In a further embodiment, the tackifier has a melt viscosity less than 500 Pa·s at 175° C., or less than 200 Pa·s at 175° C., or less than 100 Pa·s at 175° C., or less than 50 Pa·s at 175° C.

In one embodiment, the tackifier has a melt viscosity greater than 0.5 Pascal second (Pa·s) at 175° C. In a further embodiment, the tackifier has a melt viscosity greater than 1 Pa·s at 175° C., or greater than 5 Pa·s at 175° C.

In one embodiment, the tackifier has a melt viscosity from 0.5 Pa·s at 175° C., or 1 Pa·s at 175° C., or 5 Pa·s at 175° C. to less than 1000 Pa·s at 175° C., or less than 500 Pa·s at 175° C., or less than 200 Pa·s at 175° C., or less than 100 Pa·s at 175° C., or less than 50 Pa·s at 175° C. Melt viscosity can be measured using a melt viscometer, such as a Brookfield viscometer.

The C$_5$ resin for the tackifier may be obtained from C$_5$ feedstocks, such as pentenes and piperylene. The terpene resin for the tackifier may be based on pinene and d-limonene feedstocks. Hydrogenated resin for the tackifier may be based on aromatic resins such as C$_9$ feedstocks, rosins, aliphatic or terpene feedstocks.

Nonlimiting examples of suitable tackifiers include tackifiers sold under the tradenames PICCOTAC, REGALITE, REGALREZ, and PICCOLYTE, such as PICCOTAC 1095, REGALITE R1090, REGALREZ 1094, available from The Eastman Chemical Company, and PICCOLYTE F-105 from Pinova.

A tackifier may comprise a combination of two or more embodiments as described herein.

C. Ethylene-Based Polymer

The present composition includes an ethylene-based polymer. The ethylene-based polymer is different from the olefin block copolymer.

In one embodiment, the ethylene-based polymer has the following properties:
(i) a density from 0.90 g/cc to 0.94 g/cc, further from 0.91 g/cc to 0.93 g/cc, and
(ii) a melt index (I2) from 0.5 g/10 min to 75 g/10 min, further from 2 g/10 min to 65 g/10 min, further from 5 g/10 min to 50 g/10 min.

In one embodiment, the ethylene-based polymer has the following properties:
(i) a density from 0.90 g/cc to 0.94 g/cc, further from 0.91 g/cc to 0.93 g/cc,
(ii) a melt index (I2) from 5 g/10 min to 75 g/10 min, further from 10 g/10 min to 65 g/10 min, further from 15 g/10 min to 50 g/10 min, and
(iii) a melt temperature (Tm) from 90° C. to 115° C., further from 100° C. to 115° C., further from 105° C. to 115° C., further from 110° C. to 115° C.

In an embodiment, the ethylene-based polymer is an ethylene homopolymer with a melt index from 5 g/10 min, or 10 g/10 min, or 15 g/10/min, or 20 g/10 min, or 30 g/10 min to 40 g/10 min, or 50 g/10 min, or 75 g/10 min. In a further embodiment, the ethylene homopolymer has a density from 0.91 g/cc to 0.93 g/cc.

In one embodiment, the ethylene homopolymer has a melt temperature from 105° C. to 115° C., further from 110° C. to 115° C.

In one embodiment, the ethylene-based polymer is a low density polyethylene (LDPE) homopolymer made by way of free radical polymerization, at high pressures (typically an elevated pressure of at least 1000 bar (100 MPa).

In one embodiment, the LDPE has a density from 0.910 g/cc, or 0.915 g/cc, or 0.920 g/cc, to 0.930 g/cc.

In one embodiment, the LDPE has a melt index (I2 of MI) from 5 g/10 min, or 10 g/10 min, or 20 g/10 min, or 25 g/10 min, or 30 g/10 min to 40 g/10 min, or 50 g/10 min, or 60 g/10 min.

In one embodiment, the LDPE has a density from 0.910 g/cc to 0.930 g/cc, further from 0.915 g/cc to 0.927 g/cc; a Tm from 105° C. to 115° C., further from 110° C. to 115° C.; and a melt index from 10 to 60 g/10 min, further from 20 to 50 g/10 min, and further from 30 to 40 g/10 min.

A nonlimiting example of a suitable ethylene-based polymer is LDPE 955I, available from The Dow Chemical Company.

An ethylene-based polymer may comprise a combination of two or more embodiments as described herein.

A LDPE may comprise a combination of two or more embodiments as described herein.

D. Oil

The composition includes an oil. The oil typically contains greater than 95 mole percent aliphatic carbons. In one embodiment, the glass transition temperature for the amorphous portion of the oil is below (less than) −70° C.

The oil can be a mineral oil. Nonlimiting examples of suitable oils include mineral oils sold under the tradenames HYDROBRITE 550 (Sonneborn), PARALUX 6001 (Chevron), KAYDOL (Sonneborn), BRITOL 50T (Sonneborn), CLARION 200 (Citgo), and CLARION 500 (Citgo).

An oil may comprise a combination of two or more embodiments as described herein.

E. Additive

The present composition may include one or more additives. Additives include, but are
not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof.

In an embodiment, the composition comprises the following:
(a) from 30 wt %, or 40 wt % to 45 wt %, or 50 wt % or 60 wt % of the OBC (olefin block copolymer);
(b) from 30 wt %, or 40 wt % to 45 wt %, or 50 wt % or 60 wt % of the tackifier;
(c) from 5 wt %, or 8 wt % to 12 wt %, or 15 wt % or 20 wt % of the ethylene-based polymer;
(d) from 5 wt %, or 8 wt % to 12 wt %, or 15 wt % or 20 wt % of the oil; and
(e) from 0 wt %, or greater than 0 wt % to 5 wt %, or 10 wt % of at least one additive. Each weight percent is based on the weight of the composition.

In an embodiment, the composition comprises the following:
(a) from 40 wt % to 45 wt % of the OBC;
(b) from 40 wt % to 45 wt % of the tackifier;
(c) from 8 wt % to 12 wt % of the ethylene-based polymer; and
(d) from 8 wt % to 12 wt % of the oil. Each weight percent is based on the weight of the composition.

In an embodiment, the amount of OBC (olefin block copolymer) present in the composition is greater than, or equal to, the amount of tackifier present in the composition.

In an embodiment, the weight ratio of the OBC to the tackifier is from 1.0 to 2.0, further from 1.0 to 1.5, further from 1.0 to 1.2.

In an embodiment, the composition has a density from 0.850 g/cc to 0.925 g/cc. In a further embodiment, the composition has a density from 0.890 g/cc to 0.920 g/cc.

In an embodiment, the composition has a melt index from 10 g/10 min to 100 g/10 min, further from 10 g/10 min to 70 g/10 min, further from 10 g/10 min to 50 g/10 min. In a further embodiment, the composition has a melt index from 30 g/10 min to 40 g/10 min.

In one embodiment, the composition does not comprise a linear low density polyethylene, further an ethylene/C3-C8-alpha-olefin copolymer, or a high density polyethylene (i.e., ethylene-based polymer with density greater than 0.94 g/cc).

In one embodiment, the composition does not comprise a linear low density polyethylene, further an ethylene/C3-C8-alpha-olefin copolymer, and a high density polyethylene (i.e., ethylene-based polymer with density greater than 0.94 g/cc).

In an embodiment, the composition has a lap shear greater than 1 hour, or from "greater than 1 hour" to 200 hours, or 5000 hours.

In an embodiment, the composition has a 180° peel force from "0 N/inch" or "greater than 0 N/inch," or "1 N/inch" to 4 N/inch.

In an embodiment, the composition has a T-peel force "less than 10 N/inch."

In one embodiment, the composition has a T-peel force from "greater than 0 N/inch" or 1 N/inch to 10 N/inch or "less than 10 N/inch."

The inventive composition may comprise two or more embodiments disclosed herein.

Fastening Device

The present disclosure provides an article with at least one component comprising the present composition. In an embodiment, a fastening device is provided. A "fastening device," as used herein, is structure for attaching of one item to another item. The attachment between the items may be permanent, releasable, sealable, re-sealable, non-re-sealable, recloseable, or the like, and further releasable, re-sealable and/or recloseable attachment. In one embodiment, the fastening device provides re-sealable attachment between two items.

In an embodiment, the fastening device includes a first substrate and a second substrate. On a surface of each substrate is a cohesive layer (first cohesive layer on first substrate and second cohesive layer on second substrate). Each cohesive layer is independently formed from an inventive composition. In particular, each cohesive layer is independently formed from a composition comprising the following:
(a) the olefin block copolymer, as described herein;
(b) the tackifier, as described herein;
(c) an ethylene-based polymer with a density from 0.90 g/cc to 0.94 g/cc, as described herein; and
(d) an oil, as described herein.

In one embodiment, the ethylene-based polymer has a melt index from 0.5 g/10 min to 75 g/10 min, further from 20 g/10 min to 70 g/10 min, further from 30 g/10 min to 60 g/10 min.

In one embodiment, the same composition is used to form the first cohesive layer and the second cohesive layer.

In one embodiment, the fastening device is a component of a hygiene absorbent product.

In one embodiment, the first substrate is a component of a tab, or an ear, or a side panel for a hygiene absorbent product.

In one embodiment, the second substrate is a component of a landing area for a hygiene absorbent product.

In one embodiment, the fastening device is a component of a diaper or an adult incontinence article, or a training pant.

In one embodiment, the fastening device is a component of an article selected from the group consisting of the following: a medical garment, a protective garment, a medical drape, and combinations thereof.

Each substrate, the first substrate and the second substrate (collectively "the substrates")
may be, independently, a polymeric material, a cellulosic material (for example: paper), a textile product (cloth), or combinations thereof.

In one embodiment, each substrate is, independently, a polymeric material. Nonlimiting examples of suitable polymeric materials include polyolefin (propylene-based polymer, ethylene-based polymer), polyester, polycarbonate, polyurethane, polyvinyl chloride, and combinations thereof. The substrate may be a thermoplastic olefin (TPO). The substrate can be extruded, thermoformed, thermoset, injection molded, blow molded, and any combination thereof.

Upon a surface of each of the first substrate and the second substrate is a cohesive layer. A "cohesive layer," as used herein, is a layer with the ability to bond to itself, while being non-adhesive, or substantially non-adhesive, to other layers, compositions, or materials. A cohesive layer may be applied to the substrate by way of the following: lamination (such as hot melt lamination), extrusion, coextrusion, spray coating, dip coating, and combinations thereof.

Each cohesive layer, independently, may be continuous or discontinuous with its respective substrate. Each cohesive layer, independently, may be coextensive or non-coextensive with its respective substrate surface.

Figure 1:
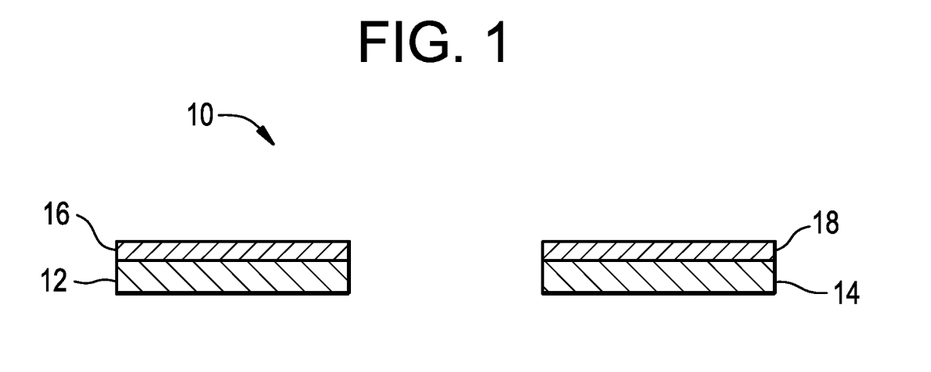
FIG. 1 shows a fastening device in accordance with an embodiment of the present disclosure.

In one embodiment, a fastening device (10) includes a first substrate (12) and a second substrate (14), each as shown in FIG. 1. On a surface of the first substrate (12) is a first cohesive layer (16). On a surface of the second substrate (14) is a second cohesive layer (18).

In one embodiment, the first substrate and the second substrate are configured to oppose each other, and to place the first cohesive layer in contact with the second cohesive layer. Application of a slight force (such as finger pressure, hand pressure, or a press or squeeze between two opposing fingers) moves the first cohesive layer into intimate contact with the second cohesive layer, to provide cohesive engagement between the first cohesive layer and the second cohesive layer. The term "cohesive engagement," as used herein, is the releasable attachment of the first cohesive layer to the second cohesive layer, each cohesive layer not adhering to dissimilar surrounding surfaces, not adhering to dissimilar materials, or not adhering to dissimilar structures. Stated differently, "cohesive engagement" is the releasable attachment of the first cohesive layer to only the second cohesive layer.

In one embodiment, the fastening device is a component of an article. The present fastening device may be a component of the following nonlimiting examples of articles: HAPs (such as disposable diapers, sanitary napkins, and incontinence products); disposable soft goods (such as surgical drapes, hospital gowns, hospital pads, face masks); snack food wrappers (such as candy, granola bars and potato chips); medical devices (such as sterilizable medical packages for items such as gauzes and bandages); self-seal and tamper-evident envelopes; banding for paper money, napkins and articles of clothing; blister-type packages; rigid or flexible packaging applications; and combinations thereof.

Figure 2:
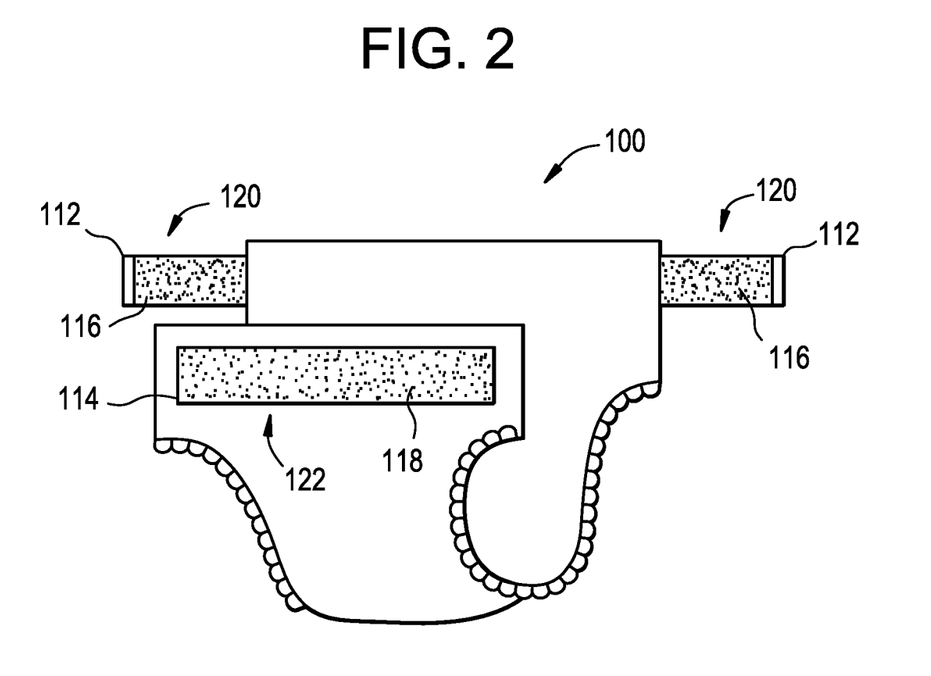
FIG. 2 shows a diaper with a fastening device in accordance with an embodiment of the present disclosure.

In an embodiment, the fastening device is a component of a diaper (100), as shown in FIG. 2. In one embodiment, the diaper (100) is a 3-layer composite structure, including a liquid impermeable outer layer, a liquid permeable inner layer, and an absorbent material sandwiched there between. The diaper (100) includes a first substrate (112) and a second substrate (114). The first substrate (112) includes a first cohesive layer (116). The second substrate includes a second cohesive layer (118). The first substrate is a component of diaper tab (120). The diaper tab (120) is attached to a rear portion of the diaper. The second substrate (114) is attached to a front portion of the diaper outer surface. In this embodiment, the second substrate (114) is the front portion of the diaper outer surface. The second cohesive layer (118) is disposed on the front portion of the diaper outer surface. The second cohesive layer (118) forms a landing area (122) for the diaper tab (120). To apply the diaper (100), the diaper tab (120) is brought around the leg of the wearer, and placed into contact with the landing area (122). The first cohesive layer (116) on the diaper tab (120) cohesively engages with the second cohesive layer (118) on the landing area (122).

The diaper tab (120) may be removed and re-applied to the landing area (122) as necessary.

The present fastening device finds advantageous application as a substitute for hook and loop fastening materials.

The fastening device may comprise two or more embodiments disclosed herein.

In the case of hygiene absorbent products, fastening systems or other devices are often used to join together various non-woven or non-woven/film laminates. These non-wovens can be produced by a variety of methods. Such methods include, but are not limited to, spunbond process, carded web process, air laid process, thermo-calendering process, adhesive bonding process, hot air bonding process, needle punch process, hydroentangling process, electro-spinning process, and combinations thereof.

In spunbond process, the fabrication of the non-woven fabric includes the following steps: (a) extruding fibers or strands of the synthetic polymer composition from a spinneret; (b) quenching the fibers or strands of the synthetic polymer composition with a flow of air, which is generally cooled, in order to hasten the solidification of the molten strands of the synthetic polymer composition; (c) attenuating the filaments by advancing them through the quench zone with a draw tension, which can be applied by either pneumatically entraining the filaments in an air stream or by winding them around mechanical draw rolls of the type commonly used in the textile fibers industry; (d) collecting the drawn strands into a web on a foraminous surface, for example, a moving screen or a porous belt; and (e) bonding the web of loose strands into the non-woven fabric. Bonding can be achieved by a variety of means, including, but not limited to, a thermo-calendering process, an adhesive bonding process, a hot air bonding
process, a needle punch process, a hydroentangling process, and combinations thereof.

The spunbond non-woven fabrics typically comprise monocomponent or bicomponent fibers. Bicomponent fibers include, for example, core/sheath, segmented pie, side-by-side, islands in the sea, and the like. A common bicomponent fiber configuration is a core-sheath structure, wherein the core often comprises homopolymer polypropylene and the sheath comprises polyethylene. The core-sheath provides drawdown capability, spinning stability, heat resistance, modulus, ultimate tensile strength inherent to polypropylene, while providing the added feature of soft touch, lower bonding temperatures, and higher elongation attributed to the addition of the polyethylene sheath.

The spunbond non-woven fabrics can be used in various end-use applications, including, but not limited to, hygiene absorbent products, such as diapers, feminine hygiene articles, adult incontinence products, wipes, bandages and wound dressings; disposable slippers and footwear applications; medical applications, such as isolation gowns, surgical gowns, surgical drapes and covers, surgical scrub suits, caps, masks; and medical packaging. Spunbond non-wovens can also be used in industrial or automotive applications, to provide low basis weight, economical, strong, and cloth-like fabrics.

The spunbond non-woven fabrics can be formed into multilayer or laminate structures. Such multilayer structures comprise at least two or more layers, wherein at least one or more layers are spunbond non-woven fabrics, as discussed herein, and one or more other layers are typically selected from the following: one or more melt blown non-woven layers; one or more wet-laid non-woven layers; one or more air-laid non-woven layers; one or more webs produced by any non-woven or melt spinning process; one or more film layers, such as cast film, blown film; and/or one or more coating layers derived from a coating composition via, for example, extrusion coating, spray coating, gravure coating, printing, dipping, kiss coating, or blade coating. The laminate structures can be joined via any number of bonding methods, such as, for example, thermal bonding, adhesive lamination such as with hot melt adhesives, ultrasonic bonding, hydroentangling, and/or needle punching. Structures can range from S to SX, or SXX, or, SXXX, or SXXXX, or SXXXXX, whereby the X can be a film, coating, or other non-woven material, in any combination, and S is a spunbond non-woven fabric.

In the case of non-wovens formed by staple fibers, the fibers can be mixed with a variety of other fibers, including synthetic fibers, such as PE, PP, PET; or natural fibers, such as cellulose, rayon, or cotton. These fibers can be wet laid, air laid or carded into a non-woven web. The non-woven web can then be laminated to other materials.

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer thus includes copolymers (typically employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomer.

The term, "ethylene-based polymer," as used herein, refers to a polymer that comprises a majority weight percent polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, a majority amount of ethylene monomer (based on the weight of the interpolymer), and at least one α-olefin. This term does not include the olefin block copolymers.

The term, "ethylene/α-olefin copolymer," as used herein, refers to a copolymer that comprises, in polymerized form, a majority amount of ethylene monomer (based on the weight of the copolymer), and an α-olefin, as the only two monomer types. This term does not include the olefin block copolymers.

The term "propylene-based polymer," as used herein, refers to a polymer that comprises, in polymerized form, a majority amount of propylene monomer (based on the total weight of the polymer) and optionally may comprise at least one polymerized comonomer.

Test Methods

Density—samples for density measurement are prepared according to ASTM D 1928. Measurements are made within one hour of sample pressing using ASTM D792, Method B.

Melt index (or I2, $I_2$ or MI) for an ethylene-based polymer, or OBC, or an inventive composition, was measured in accordance with ASTM D 1238, Condition 190° C./2.16 kg, and is reported in grams eluted per 10 minutes.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for one hour, and stabilized at 95° C. for 45 minutes. The sampling temperatures range from 95 to 30° C., at a cooling rate of 0.2° C./min. An infrared detector is used to measure the polymer solution concentrations. The cumulative soluble concentration is measured as the polymer crystallizes, while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C., and with smoothing parameters above the temperature limit of 0.1, and below the temperature limit of 0.3.

DSC Standard Method

Differential Scanning calorimetry (DSC) is used to measure crystallinity in ethylene-based polymers (PE, or OBC) samples and propylene-based polymer (PP) samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for ethylene-based polymer samples (230° C. for propylene-based polymer samples). The sample is kept at this temperature for three minutes. Then the sample is cooled at a rate of 10° C./min to −60° C. for ethylene-based polymer samples (−40° C. for propylene-based polymer samples), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for ethylene-based polymer samples (165 J/g, for propylene-based polymer samples), and multiplying this quantity by 100 (e.g., for ethylene-based polymer samples, % cryst.=($H_f$/292 J/g)×100; and for propylene-based polymer samples, % cryst.=($H_f$/165 J/g)×100).

Unless otherwise stated, melting point(s) ($T_m$) of each polymer is determined from the second heat curve obtained from DSC, as described above (peak Tm). The crystallization temperature ($T_c$) is determined from the first cooling curve (peak Tc).

GPC Method

The Gel Permeation Chromatographic system consists of either a Polymer Laboratories Model PL-210 or a Polymer Laboratories Model PL-220 instrument. The column and carousel compartments are operated at 140° C. Three Polymer Laboratories, 10-micron Mixed-B columns are used. The solvent is 1,2,4 trichlorobenzene. The samples are prepared at a concentration of "0.1 grams of polymer in 50 milliliters of solvent containing 200 ppm of butylated hydroxytoluene (BHT)." Samples are prepared by agitating lightly for two hours at 160° C. The injection volume is 100 microliters and the flow rate is 1.0 ml/minute.

Calibration of the GPC column set is performed with 21 narrow molecular weight distribution polystyrene standards, with molecular weights ranging from 580 to 8,400,000, arranged in 6 "cocktail" mixtures, with at least a decade of separation between individual molecular weights. The standards are purchased from Polymer Laboratories (Shropshire, UK). The polystyrene standards are prepared at "0.025 grams in 50 milliliters of solvent" for molecular weights equal to, or greater than, 1,000,000, and at "0.05 grams in 50 milliliters of solvent" for molecular weights less than 1,000,000. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}$=0.431 ($M_{polystyrene}$). Polyethylene equivalent molecular weight calculations are performed using VISCOTEK TriSEC software Version 3.0.

Compression Set

Compression set is measured according to ASTM D 395. Each sample is prepared by stacking "25.4 mm diameter" discs of 3.2 mm, 2.0 mm, and 0.25 mm thickness, until a total thickness of 12.7 mm is reached. The discs are cut from "12.7 cm×12.7 cm" compression molded plaques, molded with a hot press, under the following conditions: zero pressure for three minutes at 190° C., followed by 86 MPa for two minutes at 190° C., followed by cooling inside the press with cold running water at 86 MPa.

TMA

Thermal Mechanical Analysis (Penetration Temperature) was conducted on "30 mm diameter×3.3 mm thick," compression molded discs, formed at 180° C. and 10 MPa molding pressure, for five minutes, and then air quenched. The instrument is a "TMA 7 brand" available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe penetrates "1 mm" into the sample.

DMA for OBC

Dynamic Mechanical Analysis (DMA) is measured on compression molded disks, formed in a hot press at 180° C., at 10 MPa pressure, for five minutes, and then cooled (water cooled) in the press at 90° C./min. Testing is conducted using an ARES controlled strain rheometer (TA instruments), equipped with dual cantilever fixtures for torsion testing.

A "1.5 mm plaque" is pressed, and cut in a bar of dimensions "32 mm×12 mm" The sample bar is clamped at both ends between fixtures, separated by 10 mm (grip separation ΔL), and subjected to successive temperature steps from −100° C. to 200° C. (5° C. per step). At each temperature, the torsion modulus G' is measured at an angular frequency of 10 rad/s, and the strain amplitude is maintained between 0.1 percent and 4 percent, to ensure that the torque is sufficient, and that the measurement remains in the linear regime.

An initial static force of 10 g is maintained (auto-tension mode) to prevent slack in the sample, when thermal expansion occurs. As a consequence, the grip separation (ΔL) increases with the temperature, particularly above the melting or softening point of the polymer sample. The test stops at the maximum temperature or when the gap between the fixtures reaches 65 mm.

DMA (Composition)

Dynamic Mechanical Analysis (DMA)—Sample is melted onto a hot parallel plate fixtures, set at the initial test temperature. The plates are zeroed at the initial test temperature, and the sample thickness is measured on the instrument micrometer. The sample diameter is the same as the plate diameter. Samples are tested on a Rheometrics Mechanical Spectrometer (RMS-2), using "8 mm diameter" disposable parallel plate fixtures. Samples are tested in a Dynamic Temperature ramp mode from 180° C. to −80° C., at a cooling rate of 2 degrees/minute, and an applied frequency of 6.28 rad/s. AutoTension and AutoStrain modes are employed during testing. The dynamic storage and loss moduli (G' and G", respectively), as well as tan delta, are recorded as a function of temperature for each sample.

$^{13}$C NMR Analysis

The samples are prepared by adding approximately "3 g of a 50/50 mixture of tetrachloroethane-$d^2$/orthodichlorobenzene" to "0.4 g sample," in a 10 mm NMR tube. The samples are dissolved and homogenized, by heating the tube and its contents to 150° C. The data are collected using a JEOL ECLIPSE 400 MHz spectrometer or a VARIAN UNITY PLUS 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz, with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989)). Measurement of Weight Percent of Hard Segments and Soft Segments—the soft segment weight percentage (and thus the hard segment weight percentage) can be measured by DSC or NMR as disclosed in U.S. Pat. No. 7,608,668 col. 57, line 30, through col. 63, line 12.

Polymer Fractionation by TREF

Large-scale TREF (Temperature Rising Elution Fractionation) is carried by dissolving 15-20 g of polymer in two liters of 1,2,4-trichlorobenzene (TCB), by stirring for four hours at 160° C. The polymer solution is forced by 15 psig (100 kPa) nitrogen onto a "3 inch by 4 foot (7.6 cm×12 cm)" steel column, packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C., at 0.04° C. per minute, and held for one hour. Fresh TCB is introduced at about 65 ml/min, while the temperature is increased at 0.167° C. per minute.

Approximately 2000 ml portions of eluant from the preparative TREF column are collected in a 16 station, heated fraction collector. The polymer is concentrated in each fraction, using a rotary evaporator, until about 50 to 100 ml of the polymer solution remained. The concentrated solutions are allowed to stand overnight, before adding excess methanol, filtering, and rinsing (approx. 300-500 ml of methanol including the final rinse). The filtration step is performed on a three position vacuum assisted filtering station, using 5.0 μm polytetra-fluoroethylene coated filter paper (available from Osmonics Inc., Cat# Z50WP04750). The filtrated fractions are dried overnight in a vacuum oven at 60° C., and weighed on an analytical balance before further testing.

ATREF

Analytical Temperature Rising Elution Fractionation (ATREF) analysis is conducted according to the method described in U.S. Pat. No. 4,798,081, and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982). The composition to be analyzed is dissolved in trichlorobenzene, and allowed to crystallize in a column containing an inert support (stainless steel shot), by slowly reducing the temperature to 20° C., at a cooling rate of 0.1° C./min. The column is equipped with an infrared detector. An ATREF chromatogram curve is then generated by eluting the crystallized polymer sample from the column, by slowly increasing the temperature of the eluting solvent (trichlorobenzene) from 20 to 120° C., at a rate of 1.5° C./min.

Adhesive Tests

All adhesive tests (Static Shear, Static Lap Shear, 180° Peel and T-Peel) use a specimen that was prepared by coating 0.8 mil of adhesive onto 2 mil polyester (PET) film, or other substrates as noted, and then cutting the coated substrate into "one inch by six inch" strips. All subsequent adhesive test methods were measured at controlled temperature and relative humidity (RH) (72° F. and 50% RH) conditions. The overlap areas for all subsequent tests were placed on a roll down machine (ChemInstruments), and passed over twice (once in each direction) with a 4 lb weight at a rate of 12 inches per minute. Shear was a measure of the holding power of an adhesive composition when it was laminated to a substrate. Static shear measurements use a 1 kg weight to provide the separation force.

Static Shear: Shear from stainless steel was measured using test method PSTC-107 Procedure A, at "1 inch×1 inch" sample contact area with the stainless steel. The weight was hung from the measured material, placing stress on the bond between adhesive and stainless steel panel. The time, until the bond breaks and weight falls, was the number reported.

Static Lap Shear: Lap shear was measured in accordance with ASTM D3164M-03, with the following conditions: two of the same specimen strips were laminated together, cohesive facing cohesive, to form a "1 inch×1 inch" overlap area. Note that lap shear and static shear use the same weight for hanging and application methods. The difference was that static shear was an adhesive or cohesive/film construction applied to stainless steel panels; and lap shear had a cohesive/film construction fixed to a panel for support, and another cohesive/film construction laminated to this fixed cohesive area.

Peel Force was a measure of the force required to remove a film coated with an adhesive from a substrate. Peel force was measured after a 20 minute dwell time (72° F., 50% RH) and/or a 24 hour dwell time (72° F., 50% RH) after the lamination step.

180° Peel force: 180° peel force was measured using Test method PSTC 101, Test Method A, from stainless steel panels. Samples were laminated using the mechanical roll down unit described above.

T-Peel Force: T-peel force was a method used to measure the force required to peel two films coated with an adhesive, after the films have been laminated to each other, such that the adhesive sides are in contact with one another. Samples were prepared using the mechanical roll down unit and conditions described above. T-peel force was measured in accordance with ASTM D1876-08.

Some embodiments of the present disclosure will now be described in detail in the following Examples.

EXAMPLES

1. Materials

Materials for inventive examples and comparative examples are provided in Tables 1A and 1B below.

TABLE 1A

Materials

| Component | Specification | Source |
|---|---|---|
| INFUSE 9817 | OBC-ethylene/α-olefin multi-block copolymer density 0.877 g/cc Tm 120° C. MI 15.0 g/10 min | Dow Chemical |
| PICCOTAC 1095 C5 | Tackifier Specific Gravity: 0.95 g/cc (25° C.) Softening Point: 91.11-97.22° C. | Eastman |
| LDPE 955I | Low density ethylene homopolymer density 0.925 g/cc Tm 112° C. MI 35 g/10 min | Dow Chemical |
| HYDROBRITE 550 | Mineral oil Specific Gravity @ 25 C./25 C. 0.860/0.880 Kin. Viscosity @ 40 C., mm2/s 100/125 Pour Point, ° C. −9 Max | Sonneborn |

TABLE 1B

Materials

| Resin | Polymer Type | Melt Index (g/10 min) | Density (g/cc) |
|---|---|---|---|
| Dow H502-25RG | Homopolymer polypropylene | 35 (Condition 230° C.) | |
| ASPUN 6834 | Linear low density polyethylene | 17 | 0.950 |
| XZ 89203.03 | Enhanced polyethylene | 18 | 0.935 |
| LDPE 6211 | Low density polyethylene | 2.3 | 0.918 |
| ELITE 5815 | Enhanced polyethylene | 15 | 0.91 |

Substrates (used to test the Inventive Example 1 through 5) were spun on a 1.2 meter, single beam. Reicofil 4 bicomponent spunbond pilot line, using two extruders. The fibers were drawn to a nominal fiber denier of approximately two dpf, using the appropriate cabin pressure system. Throughput was kept constant at 0.51 ghm (gram per hole per minute). The die had a hole density of 6,827 holes/meter, with each hole having a diameter of 0.6 mm and l/d ratio of 4. Extruder temperatures were set at 220° C., and the die temperatures were set at 225° C., with a polymer melt temperature of approximately 230° C. Line speed was varied to achieve the appropriate basis weights as measured in GSM (gms or grams per m2). Bonding of the web took place between an engraved roll and a smooth roll, with a nip pressure of 70 N/mm, while maintaining the oil temperature of the smooth roll at 2° C. below the oil temperature of the engraved roll. The engraved roll temperature for the 20 gsm polypropylene monocomponent spunbond (PMS), and the 60 gsm homopolymer PP non-wovens in the monocomponent spunbond laminate (MSL), was 155° C. The engraved roll temperature for the 40 gsm bicomponent spunbond (BS) was 135° C.

The 60 gsm homopolymer PP spunbond was coated with a PE film layer, using a Black Clawson extrusion coater, equipped with three extruders and a 30 inch Cloeren deckle die. An 85 wt %/15 wt % blend of LDPE 621I and ELITE 5815 Enhanced Polyethylene Resin were fed into each of the extruders, and coated at a basis weight of 8 gsm. The melt temperature of the polymer blend was 315° C. The coating and the non-woven came together at the chill roll. The nip pressure was set at 60 psi. A description of the non-wovens, non-woven laminates, and polymers used in the substrates of the inventive examples are provided in Table 2 below.

TABLE 2

Substrates

| Non-woven Substrate | Resin | Fabric basis weight |
|---|---|---|
| PMS - Polypropylene Monocomponent Spunbond Non-woven | Homopolymer PP H502-25RG | 20 gsm |
| BS - Bicomponent Spunbond - 50/50 Core/sheath structure | Core Resin - homopolymer PP H502-25RG Sheath polymer - XZ 89203.03 | 40 gsm |
| MSL - Monocomponent Spunbond Laminate - Extrusion coated film on a spunbond Non-woven | Non-woven - Homopolymer PP H502-25RG Film Coating - 85%/15% polymer blend ELITE 5815 and 15% LDPE 621I | 60 gsm PP non-woven 8 gsm PE film coating |
| DSM - Diaper Stretch Material | A section of a film/non-woven laminate stretch panel material from an adult incontinence product* | |
| PET - polyethylene terephthalate film | Film purchased from Chemsultants | 2 mil untreated |

*DEPEND™ Silhouette, L/XL, Women.

2. Preparation of Cohesive Material (Composition 1)

Composition 1 was prepared using the ingredients and proportions shown in Table 3 below.

TABLE 3

| Composition 1 | |
|---|---|
| INFUSE 9817 OBC | 40.5 wt % |
| PICCOTAC 1095 C5 tackifier | 40.5 wt % |

TABLE 3-continued

| Composition 1 | |
|---|---|
| LDPE 955I | 10 wt % |
| HYDROBRITE 550 mineral oil | 9 wt % |

The ingredients in Table 3 were weighed into 5 dram glass vials, and heated on a hot plate to 130° C., with stirring for 1 hour. The composition was then spread onto crepe release paper. The crepe release paper was loaded onto a hot melt coating device. The coating blade temperature was set to 130° C., and the coating plate temperature was set to 110° C. A ChemInstruments LL-100 laboratory laminator, set to 60 psi and 0.5 speed, was used to pull material through the coater, and to laminate to silicone release paper or to one of the substrates from Table 2. A four inch wide film was coated onto the substrate.

In one example, the laminator was set to meter 1 mil of the composition from Table 3 (Composition 1), which correlates to approximately 25 grams per square meter (gsm).

In one example, the PMS substrate was nipped onto the crepe release paper, after Composition 1 was metered out, but before it cooled, by the ChemInstruments LL-100 laboratory laminator. The samples were then hot nipped together, to complete the cohesive fastener transfer from the release crepe paper to the substrate, by a Beloit Wheeler 700, set at 160° F. and 50 psi, and then the substrate with cohesive fastener material was separated from the crepe release paper transferring the cohesive to the PMS substrate, yielding material for Example 1. The adhesive test results are shown in Table 4.

The rest of the hygiene non-woven substrates (BS, MSL and DSM) were subjected to the same application methods as described above for samples using PMS as the substrate. The results for hygiene non-woven substrates are also shown in Table 4 below (Examples 2-6).

The PET substrate was subjected to the same application methods as described above for samples using PMS as the substrate. The results for PET substrate are shown in Table 5 below (Examples 7-9).

TABLE 4

Hygiene Non-woven Facestock Data for T-Peel Force, Lap Shear, and 180° Peel Force

| Example | Substrate (cut to 1" strips) (adhesive facing adhesive) | T-Peel force (N/in) 20 min dwell | Failure Mode | Both strips are backed with 1" masking tape to mitigate torque Shear, Lap 1 inch × 1 inch 1 kg (Hours) | Failure Mode* |
|---|---|---|---|---|---|
| 1 | PMS | 3.9 | F | 3.8 | A |
| 2 | BS | 5.2 | A | 4.9 | A |

| | | 180° Peel force, Stainless Steel Panel, (N/in) | | | |
|---|---|---|---|---|---|
| | | 20 minutes | | 24 hours | |
| 3 | PMS | 1 | A | 1.1 | A |
| 4 | BS | 1.4 | A | 1.3 | A |
| 5 | MSL | 0.2 | A | 0.1 | A |
| 6 | DSM | 1.1 | A | 1.2 | A |

*A—Adhesive failure; F—Facestock failure.

Table 4 illustrates the ability of Composition 1 to provide low T-peel force (1-10N/in) but high lap shear ("greater than 1 hr"–5000 hrs) using Examples 1 and 2. The failure modes are generally "adhesive," meaning the two cohesive faces remained intact when separated. The lap shear test used a 1 kg weight, which was enough weight to torque the substrates, or stretch the substrates to failure, so the substrates were reinforced with masking tape to ensure more accurate numbers. For Examples 3-6, the 180° peel force test from stainless steel, illustrate the usefulness of Composition 1 to not adhere to its environment. This is important, since the construction will come in contact with many things (human skin, other diaper components, etc) to which it should not stick.

Table 5 below illustrates the flexibility of the cohesive fastener formulation (Composition 1). The cohesive can be transferred to, or directly coated onto, PET film, as well as used for hygiene or non-hygiene applications. The PET samples were prepared by transfer coating from crepe release paper to 2 mil, untreated polyester film, and laminated through the same process as the hygiene substrates as described above. The results on PET agree with the hygiene substrates, where the fastener formulation has low peel force (Example 7), and high shear (Example 8) and high peel force from itself (Example 9).

TABLE 5

PET - Adhesion Data

| PET backing | 180° Peel force (SS) (N/in) | | | |
|---|---|---|---|---|
| | 20 min | | 24 hr | |
| Example 7 | 0.2 | A | 0.4 | A |
| | Shear, Stainless Steel 1 in. × 1 in. × 1 kGg (Hours) | | Shear, Lap 1 in. × 1 in. × 1 kG (Hours) | |
| Example 8 | 16.7 | A | 17.9 | A |
| | T-Peel (N/in) 20 min dwell | | | |
| Example 9 | 7.20 | A | | |

A—Adhesive failure.

These constructions (Examples 1-6 and 7-9), made with Composition 1, illustrate the usefulness of this inventive composition to meet closure needs of hygiene products. It has been discovered that the inventive composition provides an unexpected balance between (i) cohesion, (ii) releasability and (iii) re-attachment, when the composition comes into contact with itself.

The industry standard for fastening devices are hook and loop fasteners, which require complicated constructions, and introduce additional failure modes, such as failure via the adhesive used to mount the hook and loop fastener. Examples 1-6 and 7-9 can be reclosed multiple times, to allow for articles to be removed and reapplied. The 180° peel force tests illustrate the ability of Composition 1 (Examples 3-6 and 7) to not adhere to substrates like human skin, other parts of the article, and the general environment. Low T-Peel force, as seen in the inventive constructions (Examples 1, 2, and 9) is necessary to allow the closure to be opened, and the article to be removed from the body, and to permit repositionability of the tabs when aligning the tabs during application. High lap shear, as seen in the inventive constructions (Examples 1, 2, and 8), is necessary to hold the two tabs together when applied.

It is specifically intended that the present disclosure not be limited to the embodiments and illustrations contained herein, but include modified forms of those embodiments, including portions of the embodiments and combinations of elements of different embodiments, as come within the scope of the following claims.

The invention claimed is:

1. A composition comprising the following components:
   a) from 30 wt % to 60 wt % of an ethylene/α-olefin multi-block copolymer;
   b) from 30 wt % to 60 wt % of a tackifier;
   c) from 5 wt % to 15 wt % of an ethylene-based polymer with a density from 0.90 g/cc to 0.94 g/cc;
   d) from 5 wt % to 20 wt % of an oil; and
   e) from 0 wt % to 10 wt % of at least one additive;
   wherein each wt % is based on the weight of the composition.

2. The composition of claim 1, wherein the ethylene-based polymer has a melt index from 0.5 g/10 min to 75 g/10 min.

3. The composition of claim 1, wherein the tackifier is selected from the group consisting of the following; a non-hydrogenated aliphatic $C_5$ resin, a hydrogenated aliphatic $C_5$ resin, an aromatic modified $C_5$ resin, a terpene resin, a hydrogenated $C_9$ resin, and a combination thereof, and wherein the tackifier has a density from 0.92 g/cc to 1.06 g/cc, and a melt viscosity less than 1000 Pascal second (Pa·s) at 175° C.

4. The composition of claim 1, wherein the ethylene-based polymer is an ethylene homopolymer that has a melt index from 30 g/10 min to 50 g/10 min.

5. The composition of claim 1, comprising:
   (a) from 30 wt % to 50 wt % of the olefin block copolymer;
   (b) from 30 wt % to 50 wt % of the tackifier;
   (c) from 5 wt % to 15 wt % of the ethylene-based polymer; and
   (d) from 5 wt % to 15 wt % of the oil.

6. The composition of claim 1, wherein the amount of olefin block copolymer present in the composition is greater than, or equal to, the amount of tackifier present in the composition.

7. The composition of claim 1, wherein the composition has a density from 0.850 g/cc to 0.925 g/cc.

8. The composition of claim 1, wherein the composition has a melt index from 10 g/10 min to 100 g/10 min (190° C. and 2.16 kg).

9. The composition of claim 1, wherein the composition has a lap shear greater than 1 hour.

10. The composition of claim 1, wherein the composition has a 180° peel force from "greater than 0 N/inch" to 4 N/inch.

11. The composition of claim 1, wherein the composition has a T-peel force from 1 N/inch to 10 N/inch.

12. A film formed from the composition of claim 1.

13. An article comprising at least one component formed from the composition of claim 1.

14. The composition of claim 1, wherein the ethylene-based polymer has a density from 0.92 to 0.94 g/cc.

15. The composition of claim 1, wherein the ethylene-based polymer is an ethylene homopolymer.

* * * * *